Jan. 20, 1942. L. F. CRAWFORD Re. 22,008
FEEDING MECHANISM FOR SHAKER OR JIGGING CONVEYERS
Original Filed Oct. 3, 1938 3 Sheets-Sheet 1
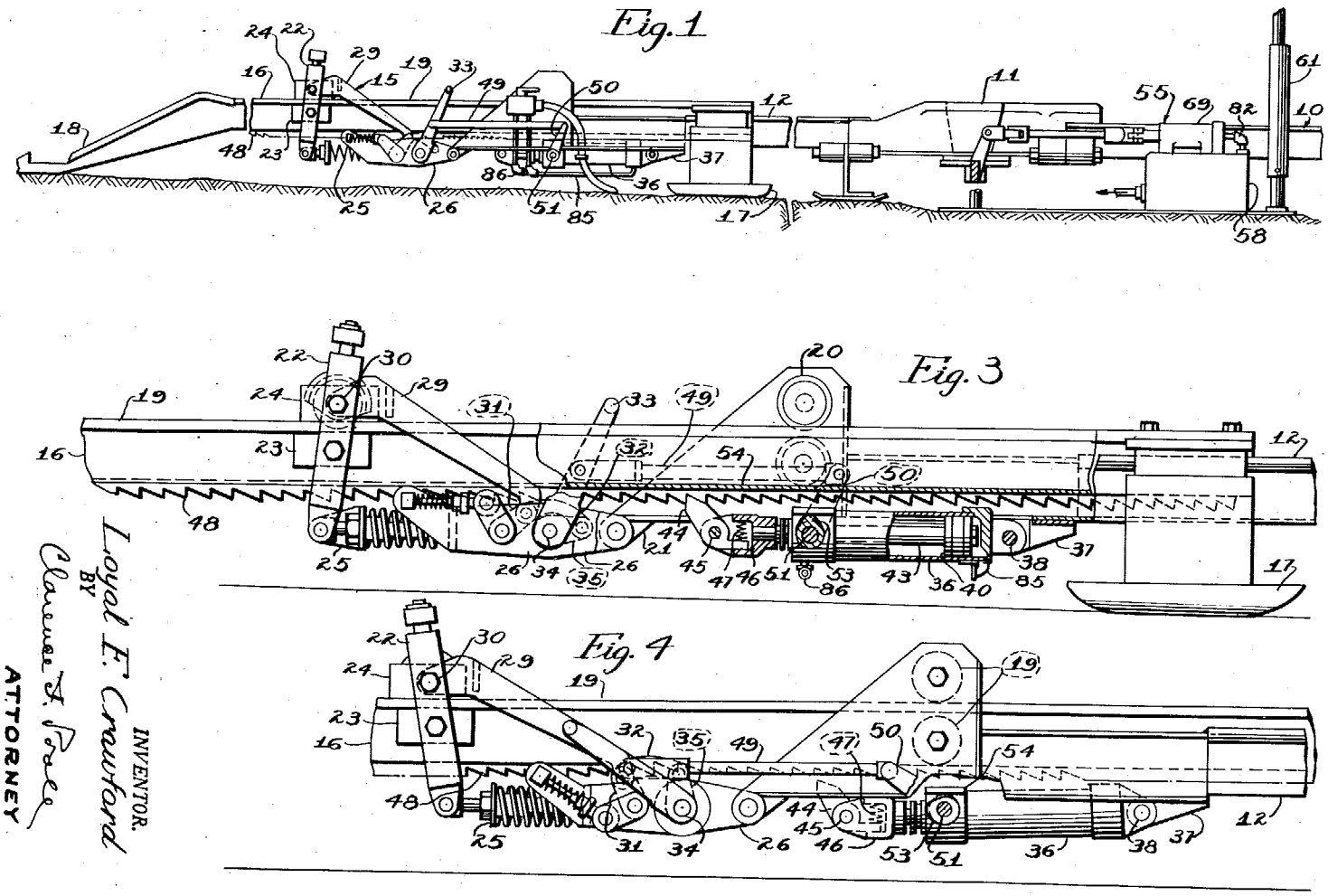
INVENTOR.
Loyal F. Crawford
BY
Clarence F. Poole
ATTORNEY Jan. 20, 1942. L. F. CRAWFORD Re. 22,008
FEEDING MECHANISM FOR SHAKER OR JIGGING CONVEYERS
Original Filed Oct. 3, 1938 3 Sheets-Sheet 2
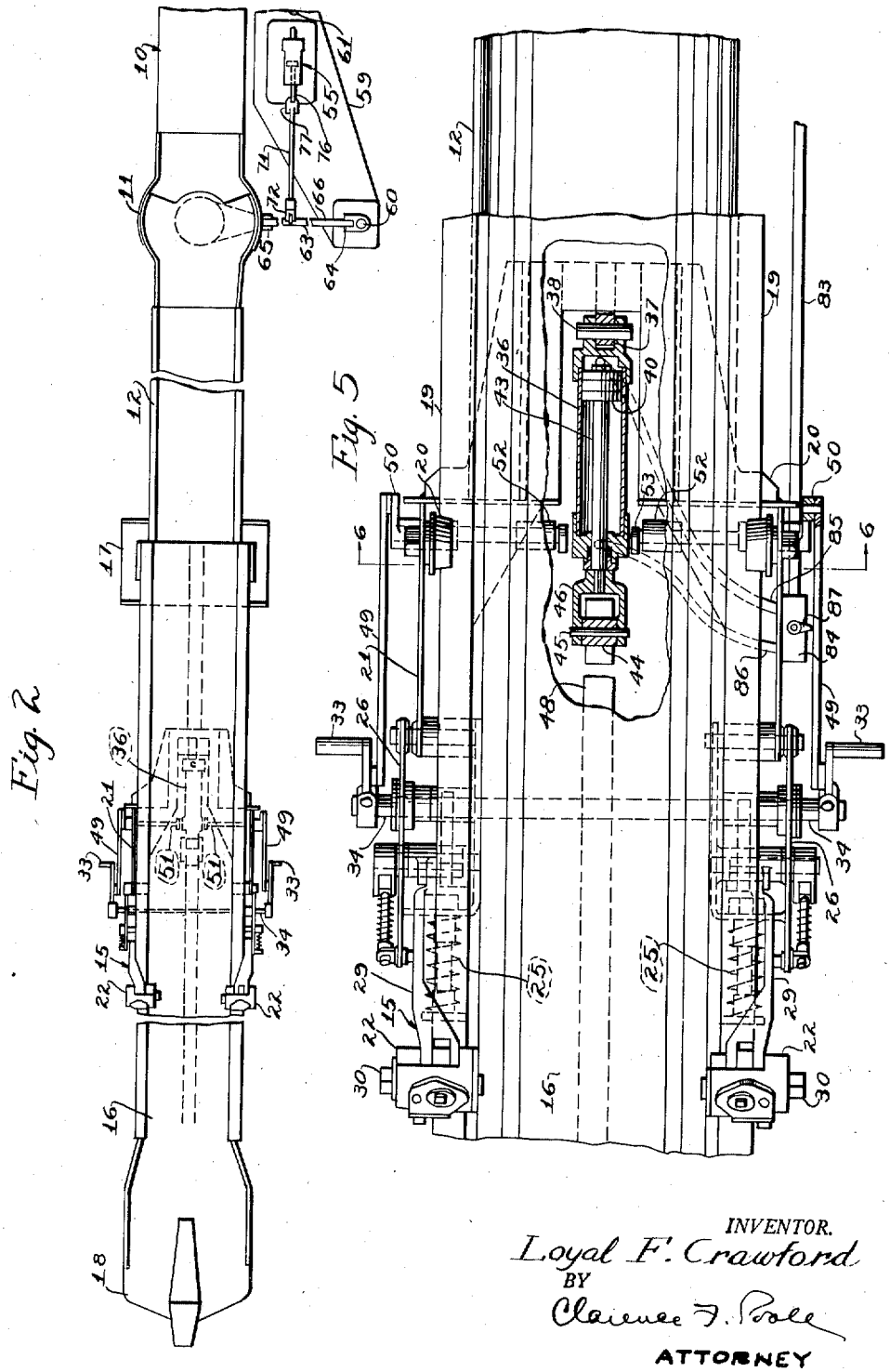
INVENTOR.
Loyal F. Crawford
BY
Clarence F. Poole
ATTORNEY Jan. 20, 1942. L. F. CRAWFORD Re. 22,008

FEEDING MECHANISM FOR SHAKER OR JIGGING CONVEYERS

Original Filed Oct. 3, 1938 3 Sheets-Sheet 3

INVENTOR.
Loyal F. Crawford
BY
Clarence J. Poole
ATTORNEY

Reissued Jan. 20, 1942

Re. 22,008

UNITED STATES PATENT OFFICE 22,008

FEEDING MECHANISM FOR SHAKER OR JIGGING CONVEYERS

Loyal F. Crawford, Beverly Hills, Calif., assignor to Goodman Manufacturing Company, Chicago, Ill., a corporation of Illinois Original No. 2,251,118, dated July 29, 1941, Serial No. 232,919, October 3, 1938. Application for reissue October 1, 1941, Serial No. 413,228

22 Claims. (Cl. 198—220)

This invention relates to improvements in feeding mechanisms for shaker or jigging conveyers of the type utilized for picking up and transporting loose material such as coal, rock, or the like in mines.

Heretofore, feeding mechanisms for shaker conveyers of the friction grip type, such as is shown in Patent No. 2,127,902, have been successfully used for extending a shovel on the end of an extensible trough section from a reciprocating trough section, both along the level and ascending grades. There are certain conditions, however, where the grade, along which the extensible trough section is to be extended, may be such as to impair the efficiency of the feeding apparatus. This is particularly true with automatic types of feeding mechanisms such as is shown in Patent No. 2,186,472 which issued to Ernst R. Bergmann on Jan. 9, 1940, wherein the shovel is extended automatically, due to the reciprocating action of the conveyer and resistance of the extensible trough section along the ground.

The principal object of my present invention is to provide a positive feeding means for an extensible trough section, auxiliary to the friction grip feeding mechanism, for holding the extensible trough section from backward slipping movement, and which is selectively operable for positively feeding this trough section where the pitch of the coal seam may be such as to impair the efficiency of the friction grip feeding mechanism.

Another object of my invention is to provide an auxiliary feeding mechanism which is fluid pressure operated and so arranged that pressure in the system is attained by the reciprocating action of the conveyer.

Other objects of my invention will appear from time to time as the accompanying specification proceeds.

My invention may be more clearly understood with reference to the accompanying drawings wherein:

Figure 1 is a view in side elevation of a shaker conveyer trough line, showing a friction grip feeding mechanism for extending or retracting an extensible trough section with respect to the conveyer trough line, with an auxiliary positive feeding mechanism constructed in accordance with my invention associated therewith;

Figure 2 is a top plan view of the trough line shown in Figure 1;

Figure 3 is an enlarged view in side elevation of the trough line with parts of the auxiliary feeding mechanism shown in substantially longitudinal section, in order to more clearly illustrate certain details of construction thereof;

Figure 4 is a view somewhat similar to Figure 3 with the parts shown in a different position of adjustment than in Figure 3;

Figure 5 is an enlarged plan view of a portion of the pan line adjacent the feeding mechanism, with certain parts broken away and shown in horizontal section in order to illustrate certain details of my invention;

Figure 7:
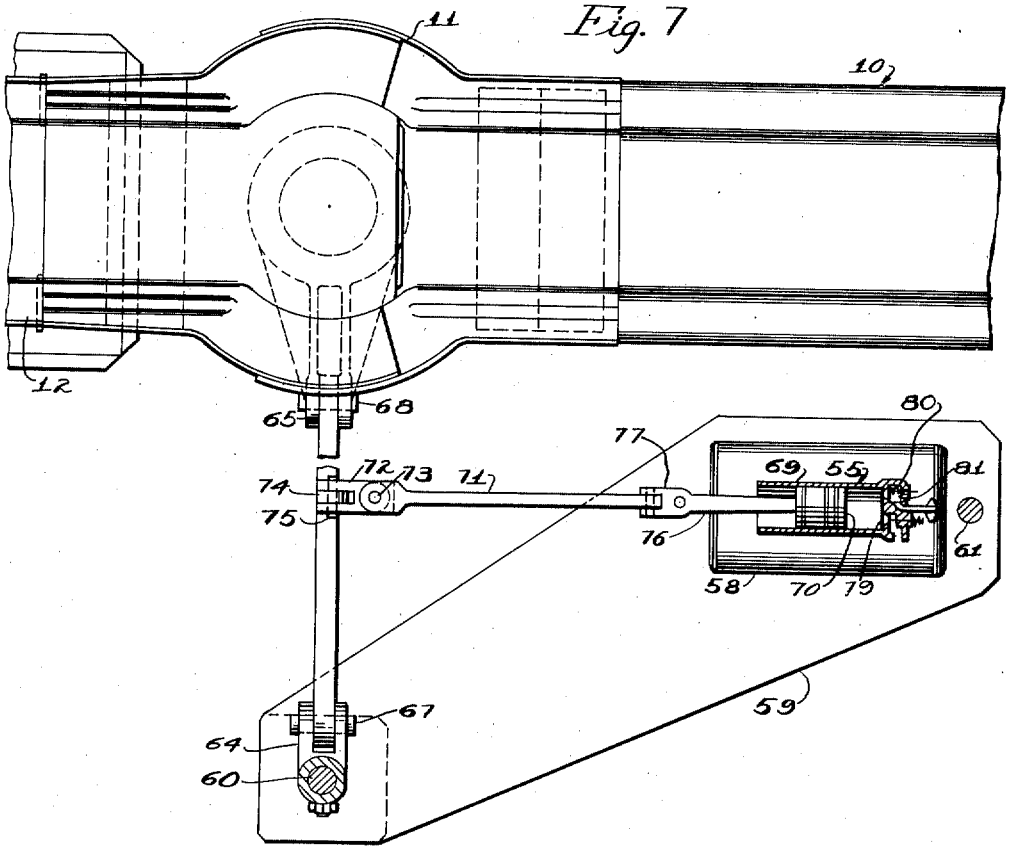
Figure 7 is an enlarged view of a portion of the trough line, illustrating the swivel and pendulum and the method of providing fluid pressure in the system.
Figure 6:
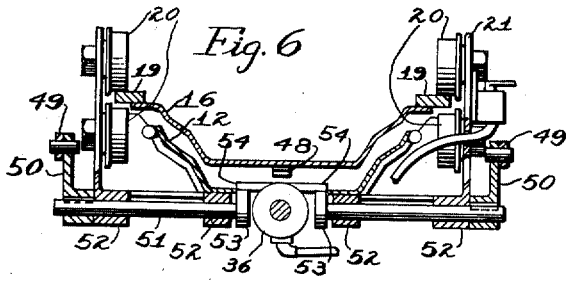
Figure 6 is a sectional view taken substantially along line 6—6 of Figure 5.

In the drawings, the embodiment of my invention illustrated includes a shaker conveyer trough line 10 having a swivel 11 interposed therein, to permit the forward end of the trough line to be swung from side to side and enable material to be gathered from various points along a working face. Said swivel is of an ordinary construction well known to those skilled in the art and has a conveyer trough section 12 secured to and projecting from its forward end.

The conveyer trough section 12 has a friction gripping type of feeding mechanism 15 pivotally mounted on the forward end thereof and disposed in advance thereof, which is adapted to extend or retract an extensible trough section 16 with respect to said conveyer trough section. Said extensible trough section is mounted at its rear end on a shoe 17 and has a shovel 18 projecting from its forward end and forming a continuation thereof and resting upon the ground at its forward end. Flanged bearing plates 19, 19 extend laterally from the upper sides of said entensible trough section, and are adapted to form a track for flanged rollers 20, 20 mounted in the upwardly projecting sides of a bracket 21. Said bracket extends beneath and forwardly from and upwardly along opposite sides of said conveyer trough section and forms a support for the feeding mechanism 15 and a means for supporting said conveyer trough section on said extensible trough section.

The feeding mechanism 15, herein shown, has been clearly illustrated and described in the aforementioned Patent No. 2,186,472 of E. R. Bergmann so will only herein be described in so far as is necessary to make my present invention clearly understandable. Said feeding mechanism includes a pair of spaced carrier members 22, 22 each having a pair of friction grip blocks 23 and 24 which are adapted to selectively engage the upper and lower surfaces of the bearing plates 19, 19. Said carrier members each have pivotal connection at their lower end with a spring link 25 which forms a means for engaging said grip blocks with said bearing plates. Said spring links are disposed below the trough section 16 and are yieldably mounted in a forked bracket 26, which projects forwardly from and is pivotally mounted on the forward end of the bracket 21. A link 29 is pivotally connected to the upper end of each of said carrier members on a bolt 30, which bolt also forms a means for pivotally connecting the upper grip block 23 to said carrier member. Said link extends downwardly and rearwardly from said carrier member and is pivotally connected at its rear end to a crank 31 (see Figure 3).

A pair of hand levers 33, 33 is provided to adjust the position of the carrier members 22, 22 to extend the shovel 18 and extensible trough section 16, which, as herein shown, is a rearwardly inclined position, or to a forwardly inclined position to retract said shovel and extensible trough section. Said hand levers are mounted on opposite ends of a transverse shaft 34 which is mounted adjacent its ends in the brackets 26, 26. Said hand levers are operatively connected with the carrier members 22, 22 to change the inclination thereof, by means of cranks 35, 35, mounted on the shaft 34 between the sides of the brackets 26, 26, and links 32, 32 connecting said cranks with the cranks 31, 31 (see Figure 3).

Figure 8:
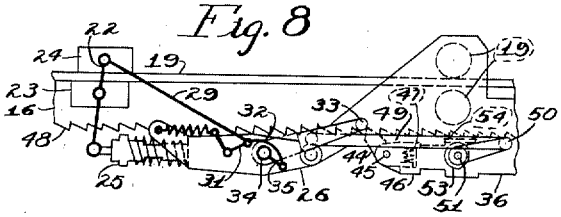
Figure 8 is a diagrammatic view in side elevation illustrating the position of the friction grip feeding device in locking position relative to the extensible trough section.

As in previous arrangements of this type, the grip blocks 23 and 24 are locked in an engaged position with respect to the bearing plates 19, 19 for locking the extensible trough with the reciprocating trough section when the hand crank or lever 33 is pivoted in a clockwise direction against the spring link 25 until the crank 33 is in a position past dead center, as is shown in Figure 8.

Referring now in particular to the means for positively extending the extensible trough section 16 from the conveyer trough section 12 when operating along ascending grades and the gripping force of the friction grip blocks 23 and 24 is not sufficient to positively extend said extensible trough section from said conveyer trough section, a fluid pressure cylinder 36 is provided. Said cylinder is herein shown as being pivotally mounted beneath the trough section 12 on a bracket 37, depending from the central portion of said conveyer trough section, by means of a transverse pin 38. Said cylinder is provided with a piston 40 having a piston rod 43 extending forwardly therefrom. Said piston rod has a pawl 44 pivotally mounted on the forward end thereof on a pin 45 secured at its ends in a forked bracket 46 which is secured to the forward end of said piston rod. A compression spring 47 is provided to yieldably hold said pawl in engagement with a rack 48 mounted on and extending along the underside of the extensible trough section 16.

The cylinder 36 is lowered about the axis of the pin 38 to permit the pawl 44 to be disengaged from the rack 48 or raised to position said pawl to engage said rack by means of either one of the hand levers 33 through a pair of links 49, 49 pivotally connected to said hand levers at one of their ends and having pivotal connection with the ends of rocking arms 50, 50 at their opposite ends. Said lever arms are secured to the outer ends of a pair of transverse shafts 51, 51 mounted on the underside of the conveyer trough section 12 in spaced apart brackets 52, 52 depending from the bracket 21. Said shafts extend transversely beneath said conveyer trough section and each has an eccentric disk or cam 53 mounted on the inner end thereof. Said cams have engagement with lateral projections 54, 54 projecting laterally in opposite directions from the upper side of the forward end of the cylinder 36. Said cams are so shaped that when the hand levers 33, 33 are positioned to extend the extensible trough section 16 with respect to the conveyer trough section 12, as shown in Figure 3, or to lock the two troughs together as shown in Figure 8, they will raise the cylinder 36 to a position to permit the pawl 44 to engage the rack 48. When said hand levers are positioned to retract said extensible trough section within said conveyer trough section, said cams will permit said cylinder to move to a lowered position about the axis of the pin 38 and thus permit said pawl 44 to become disengaged from said rack.

Referring now in particular to the means for applying fluid under pressure to the cylinder 36 and piston 40, a fluid pressure pump, generally indicated by reference character 55 is provided (see Figure 7). Said pump is herein shown as being a simple single-action cylinder type of air compressor and is mounted on a storage tank 58. Said tank is mounted on a base 59 which is suitably secured to the ground by means of roof jacks 60 and 61 adapted to be interposed between said base and the mine roof, the jack 60 also serving as a shaft about which a pendulum 63 may pivot.

The pendulum 63 forms a means for actuating the pump 55 and is pivotally connected between the jack 60 and the swivel 11. Said pendulum is adapted to swing about its axis of connection to the jack 60 upon each forward and return stroke of the conveyer and includes a member 64 pivotally mounted on the jack 60, a member 65 pivotally connected to the swivel 11 about an axis coaxial with the pivotal axis of said swivel, and a bar 66 pivotally connected with each of said members at its opposite ends on horizontal transverse pivotal pins 67 and 68, respectively.

The pump or compressor 55 is of an ordinary construction and includes a cylinder 69 mounted on the top of the tank 58 and having a piston 70 mounted therein. A connecting rod 71 is provided to operatively connect the pendulum 63 with said piston. Said connecting rod is pivotally connected at one of its ends to the pendulum 63, for movement about both horizontal and vertical axes, by means of a member 72 which is pivotally connected to said rod on a vertical pin 73 and is pivotally connected to an arm 74, projecting upwardly from the bar 66, by means of a transverse pivotal pin 75. The opposite end of said connecting rod is universally connected to a piston rod 76 by means of a member 77 pivotally connected to said piston rod for movement about a vertical axis and having said connecting rod pivotally connected thereto for movement about a horizontal transverse axis. Thus reciprocable movement of the conveyer trough line will reciprocably move the piston 70 within the cylinder 69 and compress fluid, such as air, in the tank 58.

The cylinder 69 has an inlet valve 79 and a pressure valve 80 in its head end, said pressure valve being mounted in a chamber 81 in the head end of said cylinder. Said chamber has connection with a pipe 82 which leads to the storage tank 58. A pipe 83 leads from said storage tank to a manually operated valve, generally indicated by reference character 84, and mounted in the bracket 21. A pipe 85 leads from said valve to the head end of the cylinder 36 while another pipe 86 leads from said valve to the piston rod end of said cylinder. The valve 84 is operated by means of a handle 87 (see Figure 5) so that when in one position, fluid under pressure will enter the head end of the cylinder 36 for moving the piston 40 and piston rod 43 in a forward direction and positively extend the extensible trough section 16 with respect to the conveyer trough section 12, and when moved to an opposite position, fluid under pressure will be exhausted from the head end of said cylinder and applied to the piston rod end of said cylinder to move the piston in an opposite direction.

It may be seen from the foregoing that when the conveyer is operating along an ascending grade of such a pitch that the grip blocks 23, 23 and 24, 24 will not efficiently extend said extensible trough section, that manipulation of the handle 87 will cause the piston 40 and pawl 44, engaging the rack 48, to positively extend said extensible trough section from said conveyer trough section in the hereinbefore described manner. Thus the fluid pressure cylinder with its pawl 44 engaging the rack 48 form in effect a one-way ratchet feeding device auxiliary to the friction feeding means, which may be selectively operable by power of the cylinder to extend the extensible trough section relative to the conveyer trough section, and also prevents backward slipping movement of the extensible trough section. It may also be seen that the arrangement is such that the pawl 44 holds the extensible trough section 16 from backward slipping movement when the carrier members 22, 22 are positioned to extend said extensible trough section and can only be engaged with the rack 48 for extending said extensible trough section when the carrier members 22, 22 and friction grip blocks 23 and 24 are positioned to extend the conveyer.

Under many operating conditions, it will be found that the frictional resistance of the extensible trough section against the ground will hold the latter in its extended position after the piston has moved it forwardly, so that after completion of a forward stroke, said piston may be returned to its initial rearward position ready for a repeated forward stroke, when desired. However, should it be found necessary to prevent any retraction of the extensible trough section during the brief interval in which the piston is being retracted relative thereto, it will be understood that the grip blocks 23 and 24 can be manipulated by shifting the hand levers 33 rearwardly into the position indicated in Figure 8, in which the grip blocks are fully locked in their engagement with the extensible trough section, as previously described.

While I have herein shown and described one form in which my invention may be embodied, it will be understood that the construction thereof and the arrangement of the various parts may be altered without departing from the spirit and scope thereof. Furthermore, I do not wish to be construed as limiting myself to the specific embodiment illustrated, excepting as it may be limited in the appended claims.

I claim as my invention:

1. In a shaker conveyer and in combination with an extensible trough section, means for extending said extensible trough section, and other means actuated by movement of the conveyer adapted to prevent backward slipping movement of said extensible trough section and selectively operable to positively feed said extensible trough section along ascending grades including a fluid pressure cylinder and piston and an interengaging connection between said piston and said extensible trough section.

2. In a shaker conveyer and in combination with an extensible trough section means for extending said extensible trough section and other means actuated by movement of the conveyer adapted to prevent backward slipping movement of said extensible trough section and selectively operable to positively feed said extensible trough section along ascending grades including a rack on said extensible trough section a pawl engageable in said rack and a fluid pressure cylinder and piston having operative connection with said pawl.

3. In a shaker conveyer, a conveyer trough section, an extensible trough section, feeding means for extending said extensible trough section from or retracting said extensible trough section within said conveyer trough section, means for positioning said feeding means to extend or retract said extensible trough section, other means independent of said feeding means adapted to prevent backward slipping movement of said extensible trough section and selectively operable to positively extend said extensible trough section including a fluid pressure cylinder and piston and an interengaging connection between said piston and said extensible trough section, and means actuated by said means for positioning said feeding means to extend or retract said extensible trough section for rendering said interengaging connection inoperative when said feeding means is positioned to retract said extensible trough section.

4. In a shaker conveyer, a conveyer trough section, an extensible trough section, feeding means for extending said extensible trough section from or retracting said extensible trough section within said conveyer trough section, means for positioning said feeding means to extend or retract said extensible trough section, other means independent of said feeding means adapted to prevent backward slipping movement of said extensible trough section and selectively operable to positively extend said extensible trough section including a fluid pressure cylinder and piston, a rack on said extensible trough section, a pawl operatively connected with said piston and adapted to engage said rack, and means actuated by said means for positioning said feeding means to extend or retract said extensible trough section for permitting said pawl to be disengaged from said rack when said feeding means is positioned to retract said extensible trough section.

5. In a shaker conveyer, a conveyer trough section, an extensible trough section, feeding means for extending said extensible trough section within said conveyer trough section, means for positioning said feeding means to extend or retract said extensible trough section, other means independent of said feeding means adapted to prevent backward slipping movement of said extensible trough section and selectively operable to positively extend said extensible trough section including a rack on said extensible trough section, a fluid pressure cylinder transversely pivoted to said conveyer trough section, a piston within said cylinder, a pawl operatively connected with said piston and adapted to engage said rack, and means actuated by said means for positioning said feeding means to extend or retract said extensible trough section for permitting said cylinder to pivot in a downward direction about its axis of pivotal connection to said conveyer trough section and permit said pawl to be disengaged from said rack when said feeding means is positioned to retract said extensible trough section.

6. In a shaker conveyer, a conveyer trough section, an extensible trough section, feeding means for extending said extensible trough section from or retracting said extensible trough section within said conveyer trough section, means for positioning said feeding means to extend or retract said extensible trough section, other means independent of said feeding means adapted to prevent backward slipping movement of said extensible trough section and selectively operable to positively extend said extensible trough section including a rack on said extensible trough section, a fluid pressure cylinder transversely pivoted to said conveyer trough section adjacent its rear end, a piston within said cylinder, a pawl operatively connected with said piston and adapted to engage said rack, and means actuated by said means for positioning said feeding means to extend or retract said extensible trough section for permitting said cylinder to pivot in a downward direction about its axis of pivotal connection to said conveyer trough section and permit said pawl to disengage from said rack when said extending means is positioned to retract said extensible trough section comprising a movable member supporting the forward end of said cylinder.

7. In a shaker conveyer, a conveyer trough section, an extensible trough section, feeding means for extending said extensible trough section from or retracting said extensible trough section within said conveyer trough section, means for positioning said feeding means to extend or retract said extensible trough section, other means independent of said feeding means to prevent backward slipping movement of said extensible trough section and to positively extend said extensible trough section along ascending grades including a rack on said extensible trough section, a fluid pressure cylinder transversely pivoted to said conveyer trough section, a piston within said cylinder, a pawl connected with said piston and adapted to engage said rack, and means actuated by said means for positioning said extending means to extend or retract said extensible trough section for permitting said cylinder to pivot in a downward direction about its axis of pivotal connection to said conveyer trough section and permitting said pawl to be disengaged from said rack when said feeding means is positioned to retract said extensible trough section including a cam operatively connected with said positioning means and having supporting engagement with the forward portion of said cylinder.

8. In a shaker conveyer, a conveyer trough line including a swivel, a pendulum pivotally connected to said swivel at one of its ends and to a fixed member at its opposite end, and a conveyer trough section connected to said swivel, an extensible trough section adapted to be nested within or extended from said conveyer trough section, and means adapted to prevent backward slipping movement of said extensible trough section with respect to said conveyer trough section and selectively operable to positively extend said extensible trough section including a cylinder, a piston, a pump for supplying fluid under pressure to said cylinder, fluid pressure connections between said pump and cylinder, an interengaging connection between said piston and said extensible trough section, and a connection between said pendulum and pump for actuating said pump upon reciprocable movement of the conveyer.

9. In a shaker conveyer, a conveyer trough line including a swivel, a pendulum pivotally connected to said swivel at one of its ends and to a fixed member at its opposite end, a conveyer trough section connected to said swivel, an extensible trough section adapted to be nested within or retracted from said conveyer trough section, and means adapted to prevent backward slipping movement of said extensible trough section with respect to said conveyer trough section and selectively operable to positively extend said extensible trough section including a cylinder mounted on said conveyer trough section, a pump for supplying fluid under pressure to said cylinder, a piston mounted within said cylinder, an interengaging connection between said piston and said extensible trough section for extending said extensible trough section upon extensible movement of said piston, and a link operatively connecting said pendulum with said pump for actuating said pump upon reciprocable movement of the conveyer.

10. In a shaker conveyer, a shaker conveyer trough line including a swivel, a pendulum pivotally connected to a fixed member at one of its ends and to said swivel at its opposite end, a conveyer trough section, an extensible trough section adapted to be nested within or extended from said conveyer trough section, friction gripping means for extending said extensible trough section from or retracting said extensible trough section within said conveyer trough section, and other means independent of said friction gripping means adapted to prevent backward slipping movement of said extensible trough section and selectively operable to positively extend said extensible trough section including a cylinder, a pump for supplying fluid under pressure to said cylinder, a connection between said pump and pendulum for actuating said pump upon reciprocable movement of the conveyer, a piston movable within said cylinder, fluid pressure connections between said pump and cylinder, and an interengaging connection between said piston and said extensible trough section.

11. In a shaker conveyer, a shaker conveyer trough line including a swivel, a pendulum pivotally connected to a fixed member at one of its ends and to said swivel at its opposite end, a conveyer trough section, an extensible trough section adapted to be nested within or extended from said conveyer trough section, friction gripping means for extending said extensible trough section from or retracting said extensible trough section within said conveyer trough section, and other means independent of said friction gripping means adapted to prevent backward slipping movement of said extensible trough section and selectively operable to positively extend said extensible trough section including a cylinder, a pump for supplying fluid under pressure to said cylinder, a piston movable within said cylinder, an interengaging connection between said piston and said extensible trough section including a rack on the underside of said extensible trough section and a pawl operatively connected with said piston and adapted to engage said rack, and linkage means connecting said pendulum with said pump for actuating said pump upon reciprocable movement of the conveyer.

12. In a shaker conveyer and in combination with an extensible trough section, feeding means actuated by movement of the conveyer for extending said extensible trough section, a fluid pressure cylinder and piston auxiliary to said feeding means, and an interengaging connection between said piston and extensible trough section to positively feed said extensible trough section and prevent backward slipping movement thereof when the conveyer is operating along ascending grades.

13. In a shaker conveyer and in combination with an extensible trough section, means for extending said extensible trough section, and other means adapted to prevent backward slipping movement of said extensible trough section and selectively operable to positively feed said extensible trough section including a rack on said extensible trough section, a pawl engageable with said rack, a selectively operable extensible member, a pivotal connection between said extensible member and a pawl, yieldable means for moving said pawl to a position to engage said rack, and means for positively extending said extensible member with respect to the conveyer.

14. In a shaker conveyer, a conveyer trough section, an extensible trough section, feeding means for extending said extensible trough section from or retracting said extensible trough section within said conveyer trough section, a hand lever for positioning said feeding means to extend or retract said extensible trough section, other means independent of said feeding means adapted to prevent backward slipping movement of said extensible trough section and selectively operable to positively extend said extensible trough section including an extensible member, an operative connection between said extensible member and said extensible trough section, and means actuated by said hand lever when said hand lever is in a position to cause said feeding means to retract said extensible trough section to disengage the operative connection between said extensible member and said extensible trough section.

15. In a shaker conveyer, a conveyer trough section, an extensible trough section, feeding means for extending said extensible trough section from or retracting said extensible trough section within said conveyer trough section, a hand lever for positioning said feeding means to extend or retract said extensible trough section, other means independent of said feeding means adapted to prevent backward slipping movement of said extensible trough section and selectively operable to positively extend said extensible trough section including an extensible member, a rack on said extensible trough section, a pawl operatively connected with said extensible member and adapted to engage said rack, and means actuated by said hand lever to cause said pawl to move out of engagement with said rack when said hand lever is in a position to cause said feeding means to retract said extensible trough section.

16. In a shaker conveyer, a conveyer trough section, an extensible trough section, feeding means for extending said extensible trough section from or retracting said extensible trough section within said conveyer trough section, a hand lever for positioning said feeding means to extend or retract said extensible trough section, other means independent of said feeding means adapted to prevent backward slipping movement of said extensible trough section and selectively operable to positively extend said extensible trough section including an extensible member transversely pivoted to said conveyer trough section, an operative connection between said extensible member and said extensible trough section, and an operative connection between said hand lever and said extensible member for permitting said extensible member to pivot in a downward direction and come out of operative connection with said extensible trough section when said hand lever is in a position to cause said feeding means to retract said extensible trough section.

17. In a shaker conveyer, a conveyer trough section, an extensible trough section, feeding means for extending said extensible trough section from or retracting said extensible trough section within said conveyer trough section, a hand lever for positioning said feeding means to extend or retract said extensible trough section, other means independent of said feeding means adapted to prevent backward slipping movement of said extensible trough section and selectively operable to positively extend said extensible trough section including an extensible member transversely pivoted to said conveyer trough section, an operative connection between said extensible member and said extensible trough section, and an operative connection between said hand lever and said extensible member for permitting said extensible member to pivot in a downward direction about its axis of pivotal connection to said conveyer trough section and come out of operative connection with said extensible trough section when said hand lever is in a position to cause said feeding means to retract said extensible trough section including a movable member supporting the forward end of said extensible member.

18. In a shaker conveyer, a reciprocating trough section, an extensible trough section nested within said reciprocating trough section, feeding means for extending said extensible trough section, and an extensible thrusting member mounted on said reciprocating trough section for extensible movement relative thereto, and adapted to have engagement with said extensible trough section to prevent backward slipping movement thereof when said extensible trough section is being operated upwardly along ascending grades by said feeding means, and means actuated by movement of the conveyer and selectively operable to extend said extensible thrusting member, to cause said extensible thrusting member to positively extend said extensible trough section.

19. In a shaker conveyer, a conveyer trough section, an extensible trough section, feeding means actuated by movement of the conveyer for extending or retracting said extensible trough section relative to said conveyer trough section, and other means forming a thrusting connection between said trough sections, to prevent backward slipping movement of said extensible trough section and selectively operable to positively extend said extensible trough section relative to said conveyer trough section.

20. In a shaker conveyer, a conveyer trough section, an extensible trough section, feeding means for extending said extensible trough section relative to said conveyer trough section, and other feeding means auxiliary to the first named feeding means including a power-operated extensible thrusting member carried on one of said trough sections and having selective one-way ratchet feeding engagement along the other of said trough sections for positively extending said extensible trough section and preventing backward slipping movement thereof.

21. In a shaker conveyer, a reciprocating trough section, an extensible trough section, feeding means actuated by movement of the conveyer for extending said extensible trough section, and other feeding means providing a thrusting one-way ratchet connection between said trough sections to prevent backward slipping movement of said extensible trough section and selectively operable to positively extend said extensible trough section relative to said conveyer section, said first named feeding means being movable into a locking position to hold said extensible trough section while said second named feeding means is being retracted for a repeated thrusting stroke.

22. In a shaker conveyer, a reciprocating trough section, an extensible trough section, feeding means actuated by movement of the conveyer for extending said extensible trough section, and other means including a fluid pressure cylinder and piston having a thrusting one-way ratchet connection between said trough sections to prevent backward slipping movement of said extensible trough section and selectively operable to positively extend said extensible trough section relative to said conveyer section, and said first named feeding means being movable into a locking position to hold said extensible trough section while said piston is being retracted for a repeated thrusting stroke.

LOYAL F. CRAWFORD.